United States Patent
Roddy et al.

(10) Patent No.: US 6,574,032 B1
(45) Date of Patent: Jun. 3, 2003

(54) IMAGING APPARATUS USING DITHER TO MINIMIZE PIXEL EFFECTS

(75) Inventors: James E. Roddy, Rochester, NY (US); Robert J. Zolla, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/055,781

(22) Filed: Jan. 23, 2002

(51) Int. Cl.$^7$ .............................................. G02B 26/00
(52) U.S. Cl. ..................... 359/290; 359/291; 359/298
(58) Field of Search ................... 359/290, 291, 359/292, 298, 295, 237, 238, 224, 223, 323

(56) References Cited

U.S. PATENT DOCUMENTS

| | | |
|---|---|---|
| 5,061,049 A | 10/1991 | Hornbeck |
| 5,325,137 A | 6/1994 | Konno et al. |
| 5,521,748 A | 5/1996 | Sarraf |
| 5,652,661 A | 7/1997 | Gallipeau et al. |
| 5,715,029 A | 2/1998 | Fergason |
| 5,743,610 A | 4/1998 | Yajima et al. |
| 5,745,281 A | * 4/1998 | Yi et al. ..................... 359/290 |
| 5,808,800 A | 9/1998 | Handschy et al. |

* cited by examiner

*Primary Examiner*—Hung Xuan Dang
*Assistant Examiner*—Tuyen Tra
(74) *Attorney, Agent, or Firm*—Nelson Adrian Blish

(57) ABSTRACT

An imaging apparatus (10) for forming images from digital data, typically for printing or projection, the apparatus employing a spatial light modulator (30). The spatial light modulator (30) has a mounting (70) that is flexible in at least one direction in the plane that contains the surface of the spatial light modulator (30). An actuator (80) moves the mounting (70) at a speed that is at least a multiple of the refresh rate of the spatial light modulator (30), causing the movement of the spatial light modulator (30) to effect dithering of output pixels. This enlarges the effective pixel size to improve fill factor and reduce pixelization anomalies.

45 Claims, 5 Drawing Sheets

IMAGING APPARATUS USING DITHER TO MINIMIZE PIXEL EFFECTS

FIELD OF THE INVENTION

This invention generally relates to imaging apparatus for providing images from digital data and more particularly relates to an apparatus and method for minimizing pixelization effects when forming an image using a spatial light modulator.

BACKGROUND OF THE INVENTION

Two-dimensional spatial light modulators are being widely used in a range of imaging applications from projection of color images to printing of monochrome and color images onto photosensitive media. Because it forms a complete, two-dimensional image at one time without requiring mechanical movement, the spatial light modulator offers a number of advantages over other types of imaging devices, such as scanning lasers, for example.

A spatial light modulator can be considered essentially as a two-dimensional array of light-valve elements, each element corresponding to an image pixel. Each array element is separately addressable and digitally controlled to modulate light by transmitting or by blocking transmission, or reflection, of incident light from a light source. There are two salient types of spatial light modulators that are being employed for forming images in projection and printing apparatus. The liquid crystal device (LCD) modulates an incident beam by selectively altering the polarization of light for each pixel. An LCD may be transmissive, operating by selectively transmitting the incident beam through individual array elements. Other types of LCD are reflective, selectively changing the polarization of a reflected beam at individual array elements. The second basic type of spatial light modulator currently in use is the digital micromirror device (DMD) as disclosed in U.S. Pat. No. 5,061,049. The DMD modulates by reflection at each individual pixel site.

Spatial light modulators were initially developed for digital projection applications. Examples include display apparatus such as those disclosed in U.S. Pat. No. 5,325,137 to Konno et al. and in U.S. Pat. No. 5,743,610 to Yajima et al. and miniaturized image display, such as mounted within a helmet or supported by eyewear, as is disclosed in U.S. Pat. No. 5,808,800 to Handschy et al.

More recently, spatial light modulators have been used in printing apparatus, from line printing systems such as the printer disclosed in U.S. Pat. No. 5,521,748 (Sarraf) to area printing systems, such as the printer disclosed in U.S. Pat. No. 5,652,661 (Gallipeau et al.)

It is instructive to consider some of the more important differences between projection and printing requirements for spatial light modulator devices. Effective image projection requires that the image forming device provide high levels of brightness. In display presentation, the human eye is relatively insensitive to many types of image artifacts and aberrations, since the displayed image is continually refreshed and is viewed from a distance. Motion and change also help to minimize the effects of many types of image artifacts. High resolution (as typically expressed in pixels per inch) is not a concern for projection applications, with 72 pixels per inch normally satisfactory for many types of images.

Image printing, meanwhile, presents a number of different problems. For example, when viewing output from a high-resolution printing system, the human eye is not nearly as "forgiving" to artifacts, aberrations, and non-uniformity, since irregularities in optical response are more readily visible and objectionable on printed output. High resolution may require print output at 2000 dpi (dots per inch) or higher, depending on the application.

For a number of reasons including availability and overall adaptability, LCD spatial light modulators are preferred for both projection and printing applications. However, in spite of some inherent advantages and of continuing development of LCD components, there is room for improvement in LCD imaging performance. Pixelization or gridding effects have been known imaging anomalies where pixel structure is visible in some way, possible when using LCD spatial light modulators in some types of applications. These types of imaging anomalies are primarily due to constraints on pixel fill factor, that is, on the proportion of pixel area that is modulated. Along the periphery of each pixel position is some unused area, which causes pixelization effects. Pixelization was more particularly pronounced in earlier LCD devices that had relatively low fill factors; recent advances in LCD component design are improving fill factor values somewhat. The degree of pixelization or gridding is perceived differently between projection and printing applications, and can be more or less objectionable depending upon the type, color, intensity, magnification, media MTF (Modulation Transfer Function, basically referring to spatial frequency response), media granularity, slope of the media density versus log exposure characteristic, and other characteristics of the image.

Among proposed solutions for correcting pixelization is optical dithering using a blur filter. However, as a solution for image pixelization with spatial light modulators, blur filters have a number of drawbacks. Blur filters can be sizeable and costly to design and manufacture. Blur filters do not provide a flexible solution that can be easily adapted to different imaging conditions or media. A blur filter, such as that proposed for projection systems in U.S. Pat. No. 5,715,029 (Fergason), using birefringence, can have the effect of blurring an image and can exhibit differences in response based on wavelength. Overall, optical solutions are difficult to adjust and are not suitably flexible for dithering in printing system applications.

More elaborate dithering schemes have been proposed for printing apparatus in commonly assigned U.S. patent application Ser. No. 09/630,419, filed Aug. 1, 2000, entitled "A Method and Apparatus for Printing Monochromatic Imaging Using a Spatial Light Modulator." One dithering scheme proposed is to duplicate pixel data by imaging the same data at multiple sites. This method can be used to create multiple overlapped images for the purpose of minimizing effects of pixel site defects in the spatial light modulator. Dithering is also proposed as a method for increasing the effective image resolution. A more complex sequence proposed, loosely termed the "stop-and-stare" method, uses dithering for resolution enhancement with the following basic sequence: first, with the spatial light modulator in a first position and an initial set of data loaded, source light is applied and modulated in order to form an array of pixels at this first position; then, the spatial light modulator is moved to a second position, new data may be loaded to the device, and source light is again modulated in order to form an array of pixels at this second position. The stop-and-stare method can be used to increase image resolution by a multiple of two or four, depending on the dither pattern. Solutions using the stop-and-stare method have the disadvantage, however, of increasing the amount of data that must be manipulated and exposed or projected, also by a factor of two or four correspondingly. This method can appreciably slow down the imaging process, causing visible flicker for projection applications or reduced throughput in printing applications. Overall, the dither schemes disclosed in the U.S. Ser. No. 09/630,419 application might be appropriate with some types of printing apparatus, where additional resolution is advantageous. However, the schemes disclosed in that application may not be well-suited in other types of projection and printing applications, particularly where LCD devices have linear fill factors in excess of about 80%.

It is worthwhile to be aware of a distinction between linear fill factor from area fill factor. Linear fill factor is measured along a line running through pixel centers in a row of adjacent pixel-modulating sites on the surface of a spatial light modulator. Area fill factor, on the other hand, is measured as the proportion of pixel area within a pixel-modulating site on the surface of a spatial light modulator. Either term may be used with respect to a spatial light modulator.

As was noted above, continuing development of LCD components is improving the fill factor of these devices. Because of this, the dithering approaches outlined in the U.S. Ser. No. 09/630,419 application may not be optimal for some applications using recently developed LCDs having larger fill factor. In some cases, for example, dithering without making corresponding changes in data effectively degrades image quality, so that a blurred, unsatisfactory image could be displayed or printed. Even when pixel data is changed, pixel overlap can have the objectionable effect of reducing image sharpness. For a 4-pixel dithering scheme intended to double resolution in both horizontal and vertical directions, if an LCD has a high fill factor, so that dithering causes a large pixel overlap, the resulting image appears as pixel replication rather than increased resolution. Such a dithered "high-resolution" image can actually appear to be softer than an undithered image. Under similar conditions, dither can actually degrade an image rather than improve it. This problem can be more or less pronounced depending on factors such as sensitometric characteristics of the media, effective fill factor of the spatial light modulator, and amount of pixel overlap, for example.

Thus, it can be readily appreciated that it would be advantageous to provide a dithering scheme that would eliminate gridding or pixelization effects that betray pixel structure, but where this scheme does not reduce imaging speed. It can also be appreciated that there would be advantages to a dithering method that allows some measure of adjustment and adaptation to suit specific imaging applications.

SUMMARY OF THE INVENTION

It is an object of the present invention to provide an imaging apparatus for forming an image from digital data. Briefly, according to one aspect of the present invention an imaging apparatus for forming an image from digital data comprises:

(a) a light source for providing an incident light beam;
(b) a spatial light modulator comprising a planar array of pixel sites, each pixel site capable of selectively modulating said incident light beam according to the digital data in order to form an image pixel;
(c) a movable mounting for retaining said spatial light modulator substantially within a fixed plane, said movable mounting allowing a displacement of said planar array of pixel sites in a direction along said fixed plane to within a predetermined distance between a first position and a second position, wherein said predetermined distance is less than about half the distance between adjacent pixel sites in said direction; and
(d) an actuator coupled to said movable mounting, said actuator providing said displacement of said planar array of pixel sites in said direction.

It is a feature of the present invention that it provides, using the movable mounting and its actuator, a mechanism for repeated incremental movement of the spatial light modulator, thereby increasing the effective area over which each image pixel is formed and effectively increasing the pixel fill factor.

It is an advantage of the present invention that it provides a method for pixel dithering that is inexpensive when compared against pixel replication using conventional optical dithering methods. The method of the present invention also allows adjustment of the amount of and pattern of displacement needed.

It is an advantage of the present invention that it modifies image pixel structure without placing demands on image processing hardware.

It is a further advantage of the present invention that the apparatus and method of the present invention are not resolution-dependent or dependent on pixel size, allowing a range of imaging resolutions to be used requiring a minimum of interaction between dither control hardware and image processing hardware.

It is a further advantage of the present invention that the apparatus and method of the present invention do not negatively impact the writing speed of the printing apparatus.

It is a further advantage of the present invention that it allows some measure of adjustment to compensate for fill factor variability between one imaging apparatus and the next. The present invention allows dithering to provide the maximum effect for eliminating pixelization by using diagonal motion, while having minimal effect on image sharpness.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Figure 1:
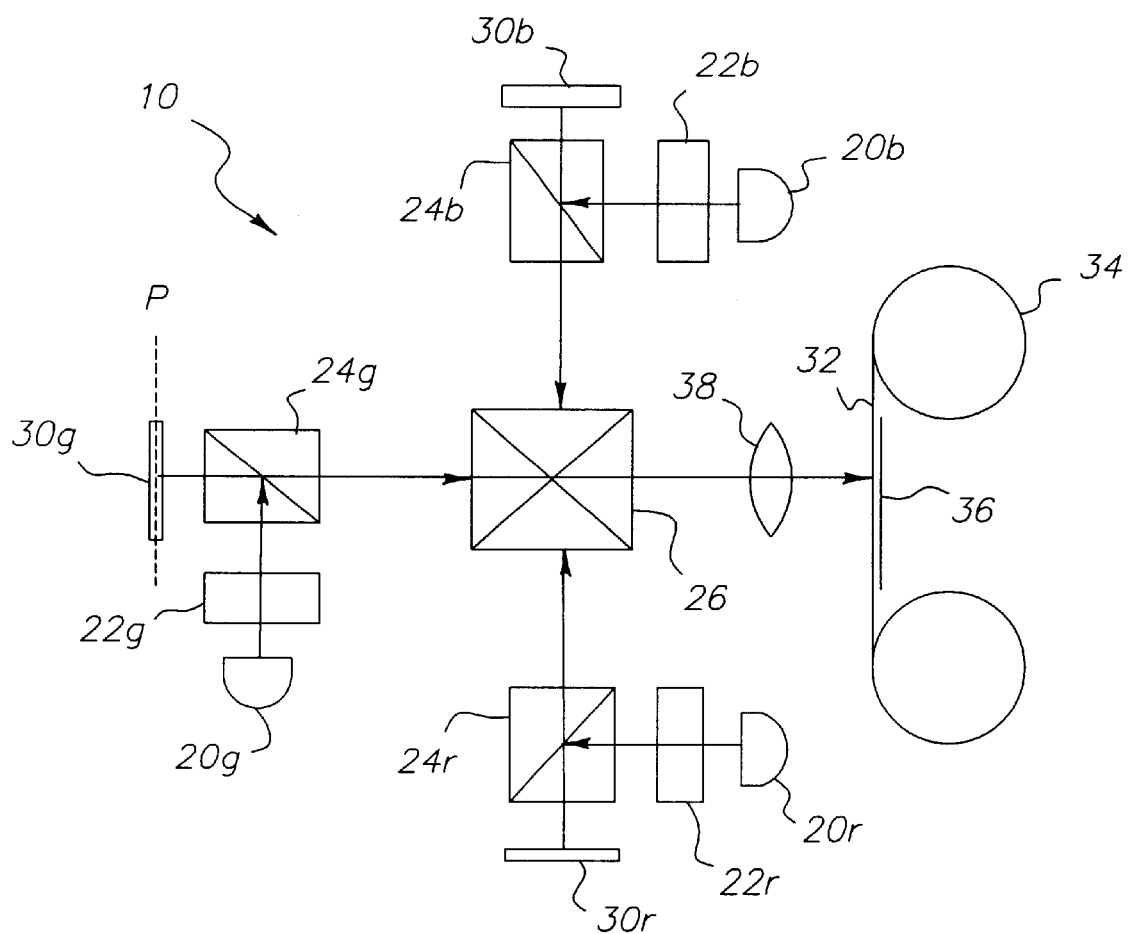
FIG. 1 is a schematic block diagram showing key components of the imaging path in a prior art printing apparatus of the present invention.

Referring to FIG. 1, there is shown, in simplified form, the basic arrangement of a prior art imaging apparatus 10 configured as a color printer. It must be observed that, for the purposes of the present invention, imaging apparatus 10 could be a printer, projector, or other image-forming device, when provided with the necessary support components. For the sake of the present description, it is sufficient merely to note the overall arrangement of the basic components of imaging apparatus 10 in the prior art arrangement of FIG. 1. There are similar components for modulating each color, represented in FIG. 1 with appended r for Red, g for Green, and b for Blue color. For a printer, a photosensitive medium 32, fed from a reel 34 onto the image plane shown as a surface 36 has characteristic Cyan, Magenta, and Yellow response corresponding to the modulated R, G, B colored light. For the Red color light modulation path, a light source 20r provides red light. Uniformizing optics 22r perform basic functions that collect light and provide uniform light for modulation. A polarization beamsplitter 24r directs unmodulated light to a spatial light modulator 24r. The light source is modulated by spatial light modulator 30r, passes through polarization beamsplitter 30r, and is combined at dichroic X-cube 26 with modulated light from corresponding components in the green light path (20g, 22g, 24g, 30g) and blue light path (20b, 22b, 24b, 30b). The modulated color image is then imaged by lens 38 for printing or projection display at surface 36.

Figure 2A:
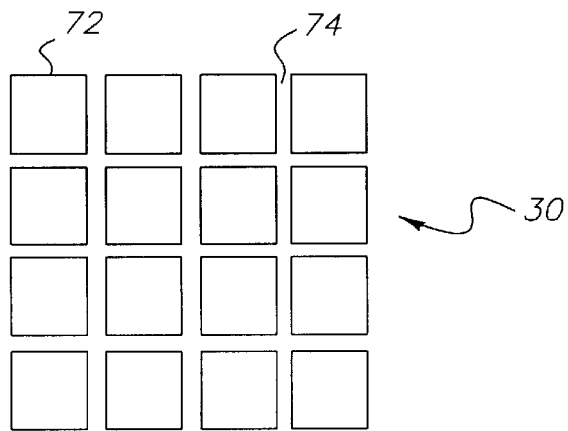
FIG. 2a is a plane view of pixel exposure areas on the photosensitive medium, exhibiting a moderately high fill factor.

Referring to FIG. 2a, there is shown the pixel pattern output from spatial light modulator 30. For each pixel position, there is a modulated pixel area 72 that provides modulated light and a dead space 74. The effective fill factor for any pixel is simply the ratio of modulated pixel area 72 to the total pixel area available, that is:

$$\frac{\text{Modulated pixel area 72}}{\text{Modulated pixel area 72} + \text{Dead space 74}}$$

Figure 2B:
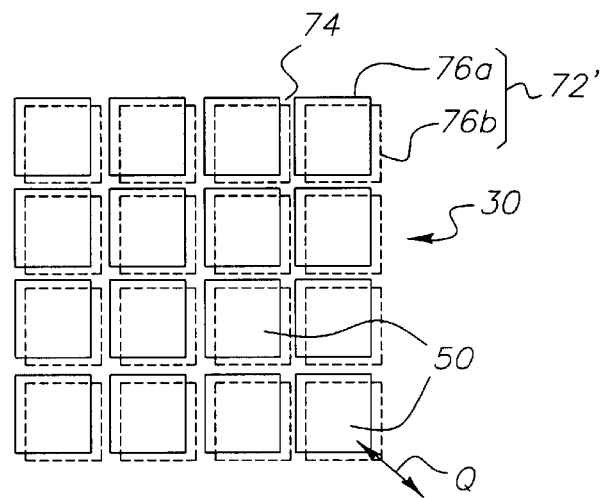
FIG. 2b is a plane view of pixel exposures as in FIG. 2a, with dithering in a substantially diagonal direction.

As is apparent from FIG. 2a, pixelization effects are most obvious when the fill factor for spatial light modulator 30 is relatively low. FIG. 2b shows a simple implementation of the method of the present invention for effectively increasing the size of modulated pixel area 72 to form an enlarged modulated pixel area 72'. Using the method shown in FIG. 2b, modulated pixel area 72 is disposed in a first diagonal position 76a, which is its original position, and then moved to a second diagonal position 76b. Enlarged modulated pixel area 72' is the combined total area of pixel area 72 in first diagonal position 76a plus the area of pixel area 76b, less the overlap. By providing a slight diagonal offset in the manner shown in FIG. 2b, the area of dead space 74 is decreased. Because first diagonal position 76a and second diagonal position 76b are spaced at about less than half the distance, in the direction of diagonal movement, Q, between adjacent pixel centers 50, adjacent enlarged modulated pixel areas 72' do not run together. Ideally, to minimize the appearance of pixel structure without degrading MTF, enlarged modulated pixel areas 72' are enlarged just enough so that adjacent edges just barely touch and do not overlap. It is instructive to note that edges of modulated pixel areas 72 are not sharply defined in typical imaging applications, but exhibit some fringe effects. In printing apparatus, gamma, grain, and MTF characteristics of the photosensitive media also contribute as factors to image pixel sharpness. Thus, depending on the type of photosensitive medium 32, some slight overlap may be acceptable.

The dithering approach illustrated in FIG. 2b has a number of advantages over other dither methods proposed for devices employing spatial light modulators 30. Because only a small increment of displacement between first and second diagonal positions 76a and 76b is used, the data content can be the same in both positions 76a and 76b.

In the preferred embodiment, dithering motion is preferably continuous during modulation. In contrast to the stop-and-stare methods noted above, the present invention thereby eliminates any delay resulting from the need to refresh data in order to move between pixel positions. The present invention also eliminates the need to cycle modulation off in order to move between pixel positions and on again upon reaching a destination, and eliminates any need for mechanical settling or delay for data stabilization. Dithering motion may even be maintained at a resonant frequency of the dither mechanism. Typically, such resonant frequencies would be significantly higher than any baseline frequency that would be required, such as for minimizing flicker anomalies. There is also some error tolerance permissible, provided that dead space 74 is minimized and adjacent enlarged modulated pixel areas 72' do not exhibit excessive overlap effects.

While diagonal displacement may be simplest to implement, it enjoys another distinct advantage. The human eye is less sensitive to diagonal displacement patterns, in contrast with orthogonal horizontal and vertical displacement. For this reason, slight degradation of MTF (that is, smearing) is less noticeable on the diagonal. Generally, any patterns created due to diagonal dithering would appear along the diagonal and would, therefore, be less visible. However, displacement of pixel position in any direction, even in orthogonal directions, could be used for creating enlarged modulated pixel area 72'.

Figure 2C:
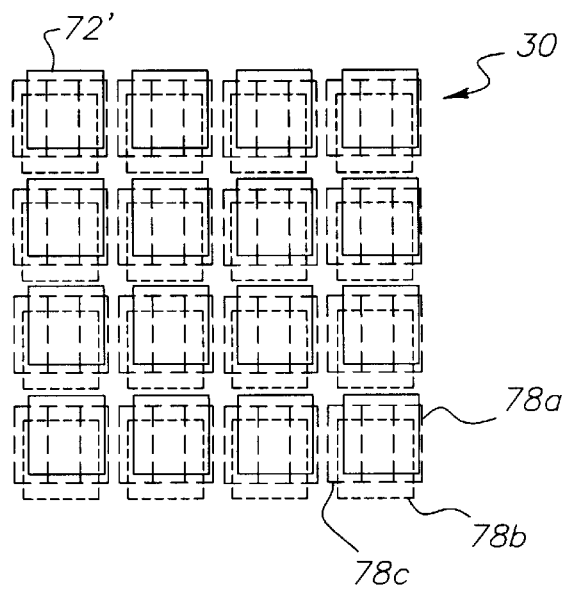
FIG. 2c is a plane view of pixel exposures as in FIG. 2a, with dithering in a substantially circular direction.

Referring to FIG. 2c, there is shown a more complex alternative, in which enlarged modulated pixel area 72' is created by displacement in a circular pattern. From its original position, modulated pixel area 72 is shifted sequentially to a first circular position 78a, then to a second circular position 78b, and to a third circular position 78c. As illustrated in FIG. 2c, this type of circular motion can significantly increase the effective size of enlarged modulated area 72' and could be particularly useful where spatial light modulator 30 has a low fill factor.

It can be readily appreciated that other patterns of movement for pixel displacement could be used.

Component Configurations for Pixel Displacement

Figure 3A:
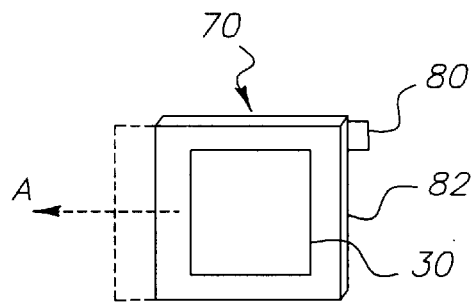
FIG. 3a is a plane view of a movable mounting capable of movement in a single orthogonal direction.
Figure 3B:
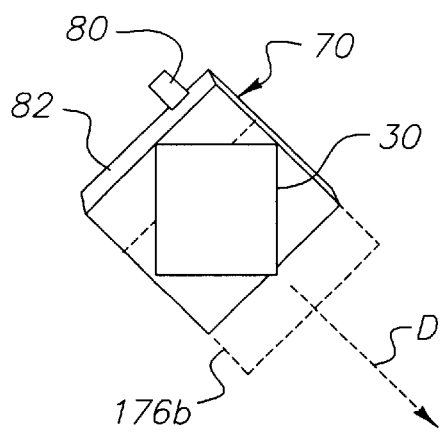
FIG. 3b is a plane view of a movable mounting capable of movement in a diagonal direction.
Figure 3C:
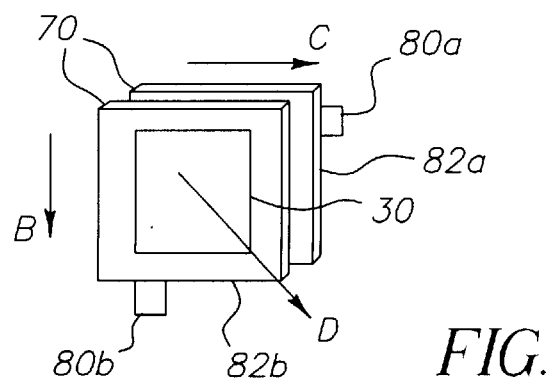
FIG. 3c is a plane view of a movable mounting having two actuators, capable of movement in an x-y plane.

Referring to FIGS. 3a, 3b, and 3c, there are shown alternative arrangements of an actuator 80 and a movable mounting 70 for obtaining displacement of modulated pixel area 72 as was shown in FIGS. 2a, 2b, and 2c. FIG. 3a shows a simple arrangement of movable mounting 70 that retains spatial light modulator 30, in which actuator 80, cooperating with a flexure 82, provides movement in the horizontal direction A indicated.

FIG. 3b shows an arrangement in which actuator 80 provides the diagonal movement pattern represented in FIG. 2b. Here, actuator 80 is mounted diagonally, as shown in dotted line form. Actuator 80 cooperates with flexure 82 to shift movable mounting 70 to a diagonal position 176b, effectively shifting each modulated pixel area 72 from first diagonal position 76a to second diagonal position 76b as shown in FIG. 2b.

FIG. 3c shows a more complex arrangement as could be used for providing the diagonal movement of modulated pixel area 72 shown in FIG. 2b, the circular movement shown in FIG. 2c, a triangular pattern, or some other movement pattern. Using the arrangement of FIG. 3c, a first orthogonal actuator 80a cooperates with a first orthogonal flexure 82a to effect movement in a first direction C. Correspondingly, for movement in a second direction B orthogonal to the first direction, a second orthogonal actuator 80b cooperates with a second orthogonal flexure 82b.

Signal Waveforms for Actuator 80

Actuators 80 can be driven with any number of drive signal types, as is well-known in the electronic arts. Example waveforms that could be applied as a drive signal to actuator 80 in order to effect different movement patterns and cause different dwell characteristics for the modulated beam include a square wave, triangular wave, sine wave, or phase-shifted triangular, square, or sine waves. In a printing apparatus, for example, depending on media MTF and other factors, it may be advantageous to employ one type of drive signal in preference to another, based on how the drive signal affects the amount of exposure energy applied to a photosensitive medium by the modulated beam. For example, with reference to the actuator configuration shown in FIG. 3b, a square-wave signal could be applied to actuator 80 to cause the displacement from first diagonal position 76a to second diagonal position 76b and back, as shown in FIG. 2b. With a square wave signal, the light beam for a pixel would move very quickly between diagonal positions 76a and 76b, with very little time spent in moving between these positions. For a photosensitive medium, the dwell time of the exposing beam for each pixel would therefore be minimal in the space between diagonal positions 76a and 76b. In contrast, a triangular wave drive signal would cause the modulated beam to move more slowly between diagonal positions 76a and 76b. With a triangular wave, the dwell time of the modulated beam would be everywhere uniform when moving between diagonal positions 76a and 76b. A sine wave or other drive signal would modify the dwell time of the modulated beam accordingly, somewhere between the extremes defined by a square wave or by a triangular wave. In general, the dwell time of the modulated beam between the end-points of movement, that is, between diagonal positions 76a and 76b, varies with the rate of change of the drive signal waveform for actuator 80.

Drive signal waveforms could also be manipulated in order to adjust dwell behavior of the modulated beam where multiple actuators 80 are used, as in the example of FIG. 3c. With multiple actuators 80, the relative phasing of drive waveforms also affects the dwell time and pattern of the modulated beam for each pixel. For the configuration of FIG. 3c, for example, providing two identical in-phase square wave drive signals to orthogonal actuators 80a and 80b would cause the diagonal motion of FIG. 2b, with minimal dwell time between diagonal positions 76a and 76b. With these drive signals as triangular waves having 90 degree phase separation, however, point-to-point motion similar to that of FIG. 2c would be effected. Alternately, smooth circular motion would be the result of 90-degree out-of-phase sine wave drive signals applied to orthogonal actuators 80a and 80b. Depending on factors such as exposure intensity and media sensitometric response characteristics, adjustment for exposure beam dwell time by varying drive signal waveform and phasing may be useful in a printing apparatus.

It is instructive to note that, for some types of actuator 80, movement patterns such as those shown in FIGS. 2a, 2b, and 2c can be further controlled by applying a bias level to the actuator 80 drive signal. Using biasing techniques, for example, diagonal displacement could be caused so that spatial light modulator 30 moves from an initial position to both an upper and a lower position.

Actuator 80 can be any of a number of types of devices that are capable of providing the slight mechanical movement needed, typically in the range of a few microns, at sufficient speed. Examples of suitable actuator 80 types include piezoelectric, electromagnetic, or electrodynamic actuators. Alternately, a small motor having a slightly eccentric cam arrangement could be employed. In a projection apparatus, movement caused by actuator 80 must be fast enough so that it is undetectable to the unaided eye. Dither frequencies in excess of 60 Hz would be suitable for most projection applications. For printing applications, actuator speed would be a factor of exposure time, with at least one half-cycle of movement provided during one exposure period. Factors such as refresh rates and type of imaging apparatus 10 would also determine the speed of actuator 80 translation movement. Because only small increments of motion are needed and mechanical accuracy requirements are not stringent, provided that pixel displacement can be used to adequately minimize the appearance of the intended pixel structure, actuator 80 need not be costly.

The amount of pixel displacement that is needed varies, depending on the fill factor of spatial light modulator 30 and on the application for which imaging apparatus 10 is used. As was noted in the background information above, printing and projection environments have different requirements for image resolution, eye sensitivity, and other characteristics. Typically, movement within the range of a few microns is sufficient to generate enlarged modulated pixel area 72' having the proper dimensions for an application. For the purposes of minimizing pixelization effects, as was shown in FIG. 2b, the amount of pixel displacement should not exceed half the distance, in the direction of displacement, between adjacent pixels. That is, for movement in a horizontal direction, the displacement provided to modulated pixel area 72 must not exceed about half the distance between horizontally adjacent modulated pixel areas 72. Similarly, for movement in a vertical direction, the displacement provided to modulated pixel area 72 must not exceed about half the distance between vertically adjacent modulated pixel areas 72. As is noted above, some error tolerance is permissible, provided that an excessive overlap condition is not caused.

Figure 4:
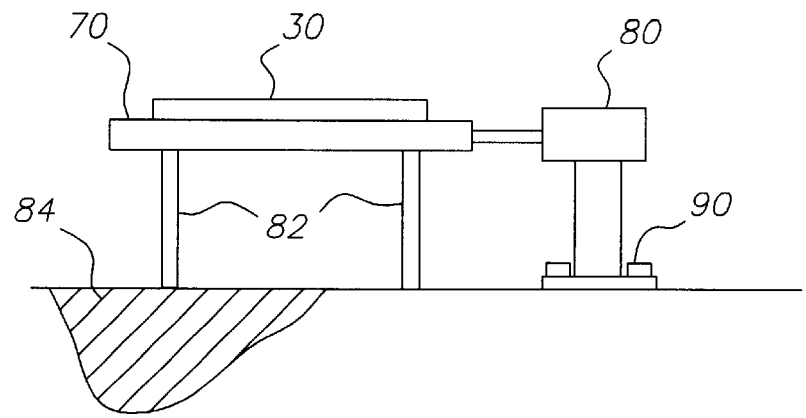
FIG. 4 shows a front view of a spatial light modulator on a movable mounting, according to the description that follows.
Figure 5:
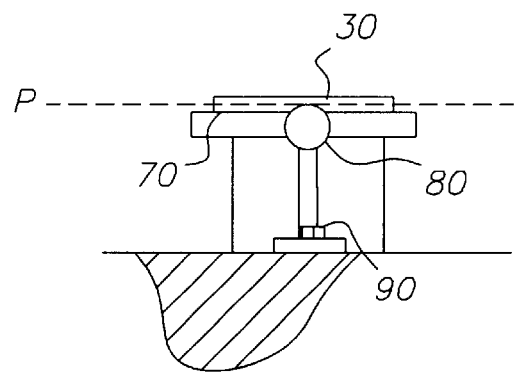
FIG. 5 shows a side view of the spatial light modulator and movable mounting shown in FIG. 4.
Figure 6:
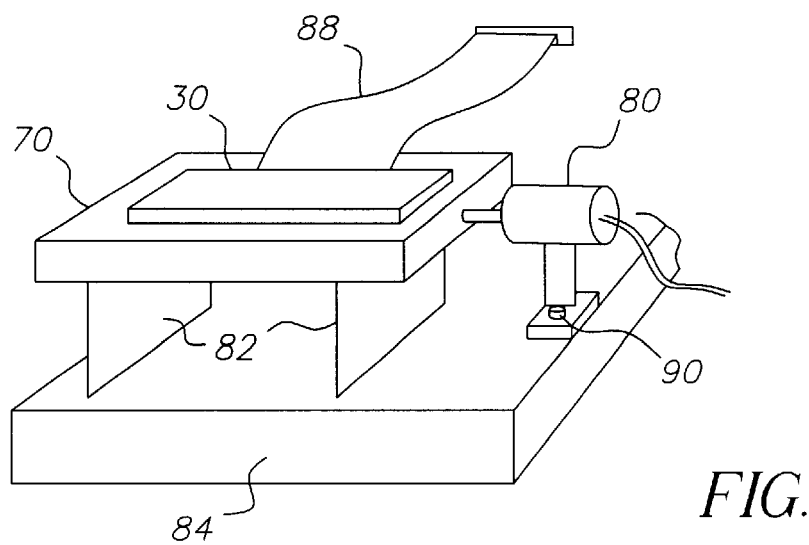
FIG. 6 shows a perspective view of the spatial light modulator and movable mounting shown in FIG. 4; and, FIG. 7 is a schematic block diagram showing an embodiment of the present invention in an imaging apparatus having a plurality of color channels.

Referring to FIGS. 4, 5, and 6, there are shown front, side, and perspective views, respectively, of an actuator 80 and movable mounting 70 arrangement in a preferred embodiment. Actuator 80 is bolted using fasteners 90 to a chassis 84 that provides a mechanical ground. Flexures 82 allow movement of movable mounting 70 so that spatial light modulator 30 can be displaced substantially within a plane. Referring back to FIG. 1 and to FIG. 5, spatial light modulator 30g would be able to move within a plane P, represented in partial cross section. However, movement toward polarization beamsplitter 24g, out of plane P, would be prevented. As shown in FIG. 6, an interconnect cable 88 to spatial light modulator 30 would be flexible to allow movement of movable mounting 70.

Flexures 82 can be any of a number of suitable flexure types, and may be metal, plastic, or other material fabricated to allow restricted movement within plane P as represented in FIGS. 1 and 5.

Multiple Color Channels

Figure 7:
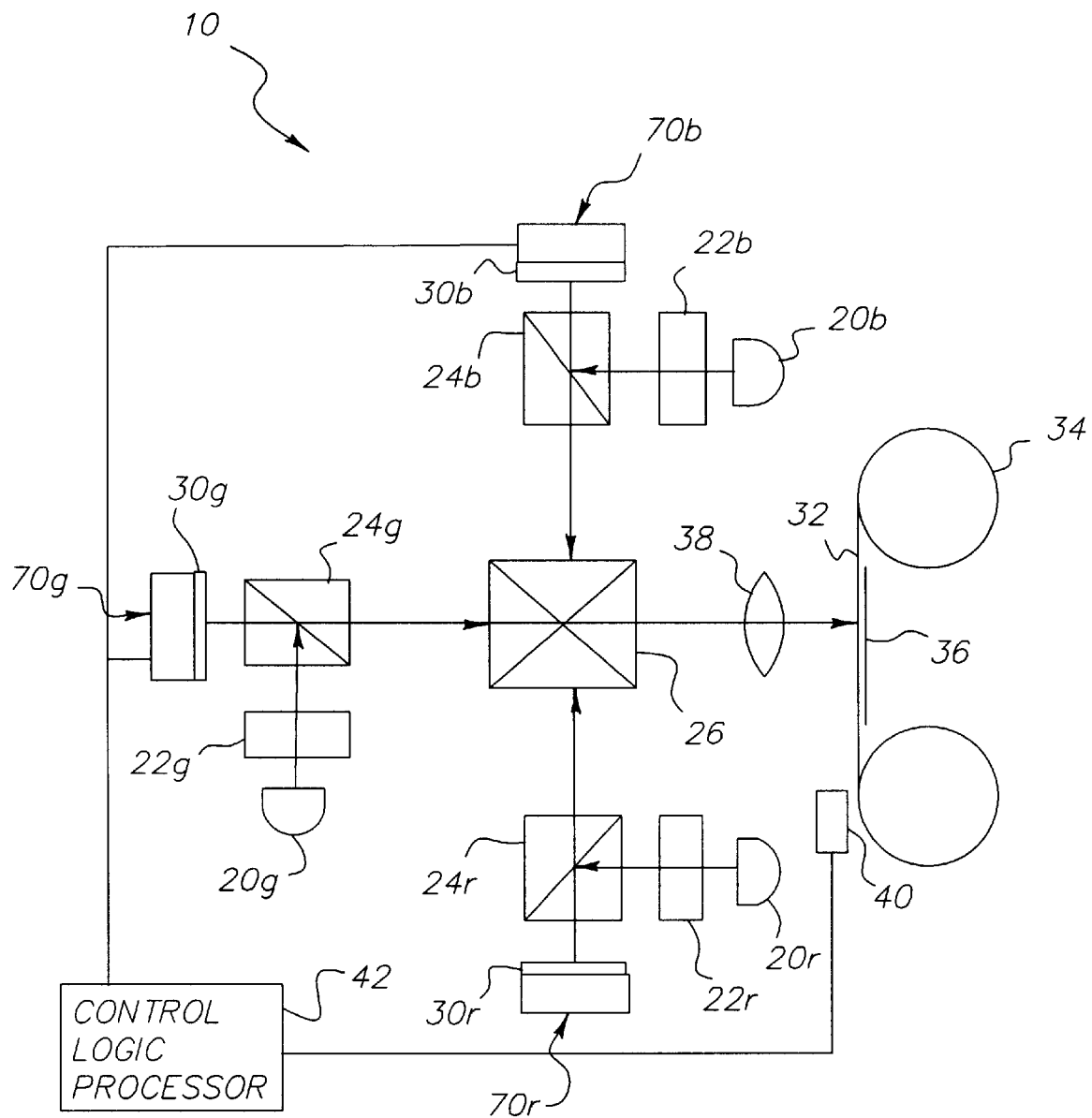

It must be emphasized that the preceding description is simplified, describing pixel displacement applied to a single color channel. In imaging apparatus 10, having a plurality of color channels, similar components would be used to provide pixel dithering on each color channel. Referring to FIG. 7, there is shown a block diagram of imaging apparatus 10 wherein each color channel (Red, Green, and Blue) comprises a corresponding movable mounting 70r, 70g, 70b.

Adaptability

The apparatus and methods of the present invention allow a measure of adjustability for adaptation in a range of printing or projection applications. The present invention provides methods that can be fine-tuned for different media types or for different projection environments, for example. This would allow imaging apparatus 10 used as a printer to adapt its dither compensation behavior to suit a specific type or batch of photosensitive paper or film and to change this behavior when imaging to another type or batch of photosensitive medium 32, for example. This arrangement even allows imaging apparatus 10 to sense variables in its imaging environment in order to determine which dither settings to use, such as for specific photosensitive media 32 or for specific projection surfaces 36 or other conditions. Referring again to FIG. 7, a sensor 40 could be used to sense the type of photosensitive media 32 in a printer and to report this information to a control logic processor 42 for controlling the behavior of each movable mounting 70r, 70g, 70b. Sensor 40 could be any number of device types, such as a photoelectric, infrared, RF frequency, magnetic, or optical sensor, for example. Control logic processor 42 would typically be a dedicated microprocessor configured for control of dither mechanisms and other functions.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. Thus, what is provided is an apparatus and method for minimizing pixelization effects when forming an image using a spatial light modulator.

PARTS LIST

10. Imaging apparatus
20. Light source
20r. Red light source
20g. green light source
20b. Blue light source
22. Uniformizing optics
22r. Uniformizing optics for red optical path
22b. Uniformizing optics for blue optical path
22g. Uniformizing optics for green optical path
24. Polarization beamsplitter
24r. Polarization beamsplitter for red optical path
24g. Polarization beamsplitter for blue optical path
24b. Polarization beamsplitter for green optical path
26. X-cube
30. Spatial light modulator
30r. Spatial light modulator for red optical path
30g. Spatial light modulator for blue optical path
30b. Spatial light modulator for green optical path
32. Photosensitive medium
34. Reel
36. Surface
38. Focusing optics
40. Sensor
42. Control logic processor
50. Pixel center
70. Movable mounting
70r. Movable mounting for red optical path
70b. Movable mounting for blue optical path
70g. Movable mounting for green optical path
72. Modulated pixel area
72'. Enlarged modulated pixel area
74. Dead space
76a. First diagonal position
76b. Second diagonal position
78a. First circular position
78b. Second circular position
78c. Third circular position
80. Actuator
80a. First orthogonal actuator
80b. Second orthogonal actuator
82. Flexure
82a. First orthogonal flexure
82b. Second orthogonal flexure
84. Chassis
88. Interconnect cable
90. Fasteners
176b. Diagonal position

What is claimed is:

1. An imaging apparatus for forming an image from digital data, the apparatus comprising:
   (a) a light source for providing an incident light beam;
   (b) a spatial light modulator comprising a planar array of pixel sites, each pixel site is for selectively modulating said incident light beam according to the digital data in order to form an image pixel;
   (c) a movable mounting for retaining said spatial light modulator substantially within a fixed plane, said movable mounting allowing a displacement of said planar array of pixel sites in a direction along said fixed plane to within a predetermined distance between a first position and a second position, wherein said predetermined distance is less than about half the distance between adjacent pixel sites in said direction; and
   (d) an actuator coupled to said movable mounting, said actuator providing said displacement of said planar array of pixel sites in said direction.

2. The imaging apparatus of claim 1 wherein said light source comprises an LED.

3. The imaging apparatus of claim 1 wherein said light source comprises a laser.

4. The imaging apparatus of claim 1 wherein said light source comprises a lamp.

5. The imaging apparatus of claim 4 wherein said lamp is a halogen lamp.

6. The imaging apparatus of claim 4 wherein said lamp is a xenon arc lamp.

7. The imaging apparatus of claim 1 wherein said spatial light modulator comprises a liquid crystal device.

8. The imaging apparatus of claim 7 wherein said liquid crystal device is reflective.

9. The imaging apparatus of claim 7 wherein said liquid crystal device is transmissive.

10. The imaging apparatus of claim 1 wherein said spatial light modulator comprises a digital micromirror device.

11. The imaging apparatus of claim 1 wherein said movable mounting comprises a spring.

12. The imaging apparatus of claim 1 wherein said actuator comprises a motor.

13. The imaging apparatus of claim 1 wherein said actuator comprises a piezoelectric actuator.

14. The imaging apparatus of claim 1 wherein said actuator comprises an electromagnetic device.

15. The imaging apparatus of claim 1 wherein said actuator comprises an electrodynamic device.

16. The imaging apparatus of claim 1 wherein said image is formed onto a surface.

17. The imaging apparatus of claim 16 wherein said surface comprises a photosensitive medium.

18. The imaging apparatus of claim 16 wherein said surface comprises a display screen.

19. The imaging apparatus of claim 1 further comprising a sensor for acquiring information about a photosensitive medium supplied to the imaging apparatus.

20. The imaging apparatus of claim 1 wherein a linear fill factor of said each pixel site is greater than about 50 percent.

21. The imaging apparatus of claim 1 wherein said displacement is not large enough to allow overlap between said adjacent pixel sites.

22. The imaging apparatus of claim 1 wherein said actuator moves said movable mounting during modulation of said incident light beam by said spatial light modulator.

23. The imaging apparatus of claim 1 wherein said direction is substantially diagonal with respect to an orthogonal arrangement of said planar array of pixel sites.

24. An imaging apparatus for forming an image from digital data, the apparatus comprising:
   (a) a light source for providing an incident light beam;
   (b) a spatial light modulator comprising a planar array of pixel sites, wherein a linear fill factor of said each pixel site is greater than about 50 percent, each pixel site is for selectively modulating said incident light beam according to the digital data in order to form an image pixel;
   (c) a movable mounting for retaining said spatial light modulator substantially within a fixed plane, said movable mounting allowing a displacement of said planar array of pixel sites in a direction along said fixed plane to within a predetermined distance between a first position and a second position, wherein said predetermined distance is less than about half the distance between adjacent pixel sites in said direction; and
   (d) an actuator coupled to said movable mounting, said actuator providing said displacement of said planar array of pixel sites in said direction.

25. An imaging apparatus for forming an image from digital data, the apparatus comprising:
   (a) a light source for providing an incident light beam;
   (b) a spatial light modulator comprising a planar array of pixel sites, each pixel site is for selectively modulating said incident light beam according to the digital data in order to form an image pixel;
   (c) a movable mounting for retaining said spatial light modulator substantially within a fixed plane, said movable mounting allowing a displacement of said planar array of pixel sites in a direction along said fixed plane to within a predetermined distance between a first position and a second position, wherein said predetermined distance is less than about half the distance between adjacent pixel sites in said direction, wherein said displacement is not large enough to allow overlap between said adjacent pixel sites; and
   (d) an actuator coupled to said movable mounting, said actuator providing said displacement of said planar array of pixel sites in said direction.

26. An imaging apparatus for forming an image from digital data, the apparatus comprising:
   (a) a light source for providing an incident light beam;
   (b) a spatial light modulator comprising a planar array of pixel sites, each pixel site is for selectively modulating said incident light beam according to the digital data in order to form an image pixel;
   (c) a movable mounting for retaining said spatial light modulator substantially within a fixed plane, said movable mounting allowing a displacement of said planar array of pixel sites in a direction along said fixed plane to within a predetermined distance between a first position and a second position, wherein said predetermined distance is less than about half the distance between adjacent pixel sites in said direction; and
   (d) an actuator coupled to said movable mounting, said actuator providing said displacement of said planar array of pixel sites in said direction, wherein said actuator is moved during modulation of said incident light beam by said spatial light modulator.

27. An imaging apparatus for forming an image from digital data, the apparatus comprising:
   (a) a light source for providing an incident light beam;
   (b) a spatial light modulator comprising a planar array of pixel sites, each pixel site is for selectively modulating said incident light beam according to the digital data in order to form an image pixel;
   (c) a movable mounting for retaining said spatial light modulator substantially within a fixed plane, said movable mounting allowing a displacement of said planar array of pixel sites in a first direction along said fixed plane to within a first predetermined offset between a first position and a second position, wherein said first predetermined distance is less than about half the distance between adjacent pixel sites in said first direction, said movable mounting also allowing a displacement of said planar array of pixel sites in an opposite direction along said fixed plane, to within a second predetermined offset between a first position and a third position, wherein said second predetermined offset is less than about half the distance between adjacent pixel sites in said opposite direction; and
   (d) an actuator coupled to said movable mounting, said actuator providing said displacement of said planar array of pixel sites in said first direction and in said second direction.

28. An imaging apparatus for forming an image from digital data, the apparatus comprising:
   (a) a light source for providing an incident light beam;
   (b) a spatial light modulator comprising a planar array of pixel sites, each pixel site is for selectively modulating said incident light beam according to the digital data in order to form an image pixel;
   (c) a first movable mounting for retaining said spatial light modulator substantially within a fixed plane, said first movable mounting allowing a displacement of said planar array of pixel sites in a first direction along said fixed plane to within a first predetermined distance between a first position and a second position, wherein said first predetermined distance is less than about half the distance between adjacent pixel sites in said first direction;

(d) a first actuator coupled to said first movable mounting, said first actuator providing said displacement of said planar array of pixel sites in said first direction;

(e) a second movable mounting for retaining said spatial light modulator substantially within a fixed plane, said second movable mounting allowing a displacement of said planar array of pixel sites in a second direction along said fixed plane to within a second predetermined distance between a first position and a third position, wherein said second predetermined distance is less than about half the distance between adjacent pixel sites in said second direction;

(f) a second actuator coupled to said second movable mounting, said second actuator providing said displacement of said planar array of pixel sites in said second direction; and wherein activating said first actuator and said second actuator imparts a dither pattern to image pixel placement in the image.

29. In an imaging apparatus using a spatial light modulator comprising a planar array of pixel sites for forming an image as an array of image pixels modulated according to digital data, a method for image pixel dithering, the method comprising:

(a) mounting the spatial light modulator on a movable mounting, said movable mounting is for allowing a displacement of the spatial light modulator in a direction substantially within a fixed plane between a first position and a second position; and (b) coupling an actuator to said movable mounting, said actuator providing said displacement such that said first position and said second position are spaced apart no further than about one half the distance between centers of adjacent pixel sites in said direction.

30. The method of claim 29 wherein the step of coupling an actuator comprises the step of coupling a piezoelectric actuator.

31. The method of claim 29 wherein the step of coupling an actuator comprises the step of coupling an electromagnetic actuator.

32. The method of claim 29 wherein the step of coupling an actuator comprises the step of coupling an electrodynamic actuator.

33. The method of claim 29 wherein said image is formed on a photosensitive medium.

34. The method of claim 29 wherein said image is formed on a surface.

35. The method of claim 34 further comprising the step of:
(e) sensing information about said surface; and
(f) modifying said displacement of the spatial light modulator based on said information.

36. The method of claim 35 wherein modifying said displacement comprises changing the direction of said displacement.

37. The method of claim 29 wherein said direction is substantially diagonal with respect to an orthogonal arrangement of said array of image pixels.

38. In an imaging apparatus using a spatial light modulator comprising a planar array of pixel sites for forming an image as an array of image pixels modulated according to digital data, a method for dithering said array of image pixels, the method comprising periodically displacing said spatial light modulator between a plurality of positions, each said position being no further from any other said position than about one half the distance between centers of adjacent said pixel sites in the direction of the displacement.

39. In a printing apparatus using a spatial light modulator comprising a planar array of pixel sites for forming an image as an array of image pixels modulated according to digital data, a method for adjusting the duration of exposure dwell between a first point and a second point during image pixel dithering, the method comprising adjusting the rate of change of the drive waveform of an actuator coupled to said spatial light modulator.

40. In an imaging apparatus using a spatial light modulator comprising a planar array of pixel sites for forming an array of modulated beams according to digital data, said modulated beams directed towards a surface, a method for adjusting the duration of dwell of each said modulated beam between a first point on said surface and a second point on said surface during image pixel dithering, the method comprising adjusting the rate of change of the drive waveform of an actuator coupled to said spatial light modulator.

41. In an imaging apparatus using a spatial light modulator comprising a planar array of pixel sites for forming an image as an array of image pixels directed to a surface, said array of image pixels modulated according to digital data, a method for image pixel dithering, the method comprising:

(a) modulating an incident light beam at said spatial light modulator to form a modulated light beam for forming said image on said surface as said array of image pixels; and (b) actuating an actuator coupled to said spatial light modulator to move said modulated light beam in a direction between a first position and a second position with respect to said surface, such that said first position and said second position are spaced apart no further than about one half the distance between centers of adjacent image pixels in said direction, said actuator controlled by a drive signal having a predetermined rate of change.

42. The method of claim 41 wherein said predetermined rate of change is constant.

43. The method of claim 41 wherein said predetermined rate of change varies sinusoidally.

44. In an imaging apparatus using a spatial light modulator comprising a planar array of pixel sites for forming an image as an array of image pixels directed to a surface, said array of image pixels modulated according to digital data, a method for image pixel dithering, the method comprising:

(a) modulating an incident light beam at said spatial light modulator to form a modulated light beam for forming said image on said surface as said array of image pixels;

(b) actuating a first actuator coupled to said spatial light modulator to move said modulated light beam in a first direction between a first position and a second position with respect to said surface, such that said first position and said second position are spaced apart no further than about one half the distance between centers of adjacent image pixels in said first direction, said first actuator controlled by a first drive signal having a first predetermined rate of change; and (c) actuating a second actuator coupled to said spatial light modulator to move said modulated light beam in a second direction between a first position and a third position with respect to said surface, such that said first position and said third position are spaced apart no further than about one half the distance between centers of adjacent image pixels in said second direction, said second actuator controlled by a second drive signal having a second predetermined rate of change, said second direction orthogonal to said first direction.

45. The method of claim 44 wherein said first predetermined rate of change varies sinusoidally and said second predetermined rate of change varies sinusoidally and said first predetermined rate of change is 90 degrees out of phase with respect to said second predetermined rate of change, in order to effect a circular motion of said modulated light beam.

* * * * *